S. A. SEAL.
VEHICLE SEAT.
APPLICATION FILED NOV. 13, 1913.
1,100,919.
Patented June 23, 1914.
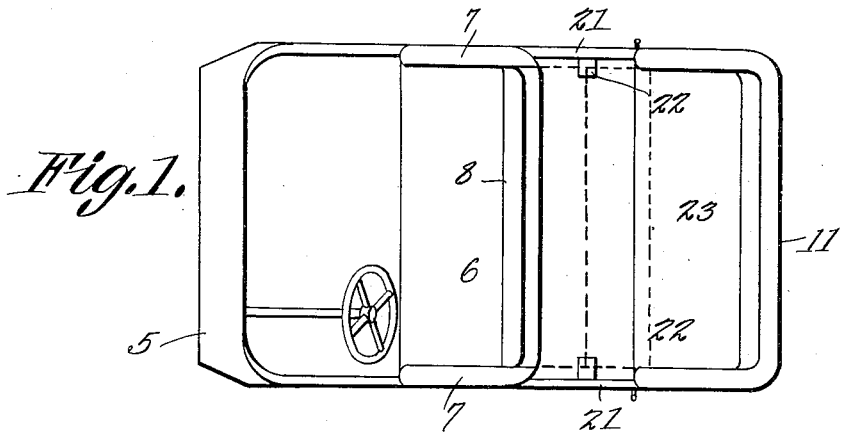
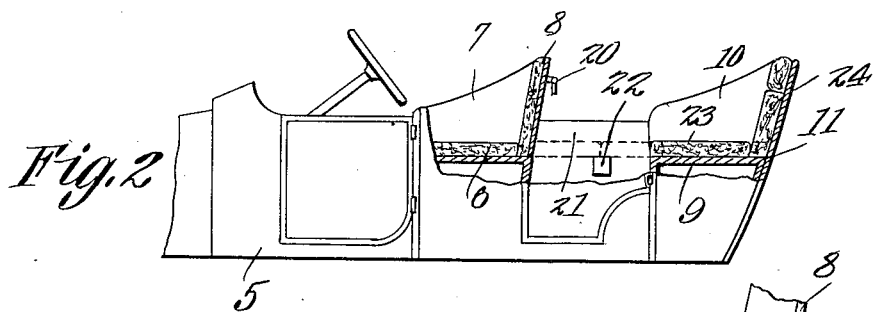
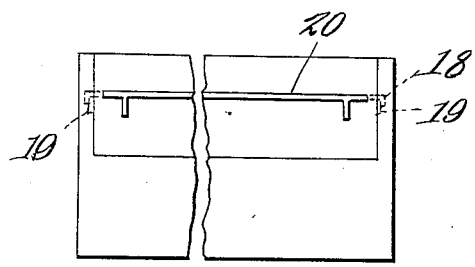
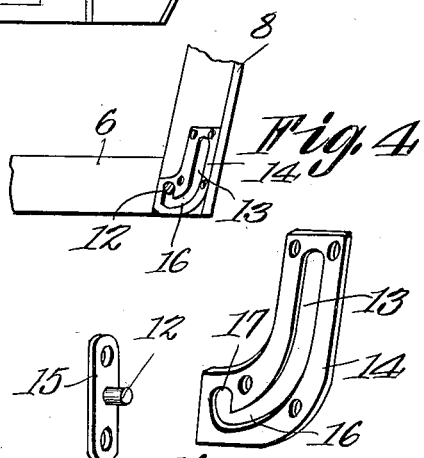
S. A. Seal
Inventor
by Max A. Schmidt
Attorney
Witnesses
F. B. Wooden
M. C. Lucas
COLUMBIA PLANOGRAPH CO., WASHINGTON, D. C.

UNITED STATES PATENT OFFICE.

SHELBY A. SEAL, OF GRAND ISLAND, NEBRASKA.

VEHICLE-SEAT.

1,100,919. Specification of Letters Patent. Patented June 23, 1914.

Application filed November 13, 1913. Serial No. 800,784.

*To all whom it may concern:*

Be it known that I, SHELBY A. SEAL, a citizen of the United States, residing at Grand Island, in the county of Hall and State of Nebraska, have invented certain new and useful Improvements in Vehicle-Seats, of which the following is a specification.

This invention relates to seats for automobiles and other vehicles, and its object is to provide the vehicle with a front seat having a back-rest which can be easily and quickly moved to horizontal position into alinement with the front and back seat bottoms, thereby converting said seats into a bed, so that the vehicle may be used for sleeping.

The invention also has for its object to provide a seat structure which is simple and inexpensive, and which does not mar the appearance of the vehicle.

These objects are attained by means of a novel combination and arrangements of parts to be hereinafter described and claimed, and in order that the invention may be better understood, reference is had to the accompanying drawing, in which—

Figure 1 is a plan view of an automobile body, showing the improved seat structure; Fig. 2 is a side elevation, partly in section; Fig. 3 is a rear elevation of the front seat; Fig. 4 is a detail of the back-rest hinge and Fig. 5 is a perspective view of the hinge members.

Referring specifically to the drawing, 5 denotes the body of an automobile having front and rear seats. The front seat comprises a bottom 6, sides 7 and a cushioned back-rest 8. The rear seat comprises a bottom 9, sides 10 and a back-rest 11.

The back-rest 8 is hinged to the sides 7, so that it may be swung down to horizontal position into alinement with the front and rear seat bottoms, and form in conjunction therewith a bed, thus enabling the car to be used for sleeping.

The hinges of the back-rest 8 are at the bottom thereof, and they comprise hinge-pins 12 projecting inward from the sides 7, and extending into slots 13 in plates 14 mounted on the side edges of the back-rest. The hinge-pins are on plates 15 which are rigidly secured to the sides 7. The slots 13 run parallel to the side edges of the back-rest, and at their lower ends they have a forward arcuate curve 16 terminating in a short upwardly extending portion 17 in which the hinge-pins normally seat.

The back-rest carries latches 18 engageable with keepers 19 on the sides 7, to hold the back-rest in upright position. Upon disengaging the latches from their keepers, the back-rest is left free to be swung down into horizontal position. The operating handle of the latches may be arranged to form a robe-rail 20.

On the inner faces of the rear doors 21 of the car body 5 are secured abutments 22 on which the back-rest 8 is supported when in horizontal position.

When the back-rest is in horizontal position, its rear edge is spaced from the forward edge of the cushion 23 of the rear seat bottom 9, and in order to fill this space, I provide the back-rest 11 with a cushion having a removable bottom section 24. This cushion section will be removed from the back-rest and placed between the rear edge of the cushion of the back-rest 8 and the forward edge of the cushion 23, one end being supported on the abutments 22, and the other end on the seat bottom 9. In order to allow the cushion section 24 to rest on the seat bottom 9, the cushion 23 will be shifted rearward, this being possible as the cushion section 24 has been removed from the back-rest 11.

With the parts positioned as herein described, a comfortable bed is had, the cushions of the front and back seat bottoms, the cushion of the back rest 8 and the cushion section 24 being all in horizontal alinement. The upholstering will be done in such a manner that all joints between movable and stationary parts are hidden.

To fold the back-rest 8 to horizontal position, it is first lifted until the parts 17 of the slots 13 clear the hinge-pins 12, and it is then swung down. That portion of the slots which is parallel to the side edges of the back-rest allows the back-rest to be pushed forward to bring the cushion thereof against the cushion of the front seat bottom.

I claim:

The combination of a vehicle seat comprising a bottom, sides and a back-rest, alined hinge-pins projecting inward from the sides of the seat at the bottom thereof, and slotted plates on the side edges of the back-rest at the bottom thereof, into the slots of which plates the hinge-pins extend, said slots being parallel to the side edges of the back-rest and having an arcuate forward curve at the bottom terminating in an upwardly extending portion in which the hinge-pins normally seat.

In testimony whereof I affix my signature in presence of two witnesses.

SHELBY A. SEAL.

Witnesses:
R. R. HUNT,
M. GUY BRITT.

Copies of this patent may be obtained for five cents each, by addressing the "Commissioner of Patents, Washington, D. C."